(12) United States Patent
Linnenbrügger et al.

(10) Patent No.: US 6,346,058 B1
(45) Date of Patent: Feb. 12, 2002

(54) ENDLESS FLEXIBLE TORQUE-TRANSMITTING DEVICE

(75) Inventors: André Linnenbrügger, Bühl; Wolfgang Oberle, Appenweier, both of (DE)

(73) Assignee: LuK Getriebe Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/472,678

(22) Filed: Dec. 27, 1999

(30) Foreign Application Priority Data

Dec. 28, 1998 (DE) .......................... 198 60 417

(51) Int. Cl.⁷ .................... F16G 13/04; F16G 13/02
(52) U.S. Cl. ................ 474/215; 474/212; 474/214; 474/229
(58) Field of Search ............... 474/212, 213, 474/214, 215, 202, 206, 216, 217, 201, 242–245, 229, 228

(56) References Cited

U.S. PATENT DOCUMENTS

| | | | | |
|---|---|---|---|---|
| 3,043,154 A | * | 7/1962 | Karig et al. | 474/215 |
| 3,353,421 A | * | 11/1967 | Ketterle et al. | 474/215 |
| 4,335,057 A | * | 6/1982 | Horowitz et al. | 474/215 |
| 4,581,001 A | * | 4/1986 | Rattunde et al. | 474/214 |
| 5,176,584 A | * | 1/1993 | Ishida et al. | 474/213 |

FOREIGN PATENT DOCUMENTS

| | | | | |
|---|---|---|---|---|
| DE | 3027834 | * | 2/1982 | |
| DE | 35 256 062 | | 6/1987 | F16H/9/24 |
| DE | 33 24 318 | | 7/1987 | F16H/9/24 |
| DE | 3819599 | * | 7/1989 | |
| DE | 38 26 809 | | 8/1989 | F16H/9/24 |
| DE | 4415838 | * | 5/1994 | |
| DE | 43 30 696 | | 3/1995 | F16H/9/24 |
| JP | 169148 | * | 7/1989 | |

* cited by examiner

Primary Examiner—David A. Bucci
Assistant Examiner—Marcus Charles
(74) Attorney, Agent, or Firm—Darby & Darby

(57) ABSTRACT

A flexible torque-transmitting device (1) such as a chain belt that runs in an endless loop around a first and second pair of conical disks in a continuously variable transmission of a motor vehicle includes means to keep the transverse force-transfer elements (2a, 2b) from becoming dislodged out of their seating positions in the lengthwise-running links (3a, 3b, 3c) of the chain belt.

13 Claims, 4 Drawing Sheets

ENDLESS FLEXIBLE TORQUE-TRANSMITTING DEVICE

BACKGROUND OF THE INVENTION

The invention relates to an endless flexible torque-transmitting device as used in particular in a continuously variable transmission of a motor vehicle where the endless flexible torque-transmitting device is arranged in the torque flow between a first and a second pair of conical disks. The endless flexible torque-transmitting device has force-transfer elements that are perpendicular to the running direction and are engaged in openings of links that are parallel to the running direction, so that the force-transfer elements form articulated joints between the links.

The first pair of conical disks is connected, or at least connectable, to an input shaft of the transmission, and the second pair of conical disks is connected, or at least connectable, to an output shaft of the transmission. Transmissions of this kind can be used, e.g., in motor vehicles, and prove to have a particularly favorable effect on fuel consumption. Endless flexible torque-transmitting devices, also known as chains or chain belts, are known, e.g., from the German patent DE-PS 43 30 696, among others. In endless flexible torque-transmitting devices in accordance with the referenced patent, force-transfer elements that are oriented transverse to the running direction are combined in an articulated arrangement with links that are parallel to the running direction. To transmit a force or torque between the conical disk pairs of the transmission, end surfaces of the force-transfer elements or end surfaces of additional bolts are in force-transmitting contact-e.g. through friction forces—with the pairs of conical disks, particularly with the lateral surfaces of the conical disks. The German patent DE-PS 43 30 696 discloses an endless flexible torque-transmitting device without additional bolts, in which the end surfaces of the force-transfer elements are in force-transmitting contact, specifically in frictional contact, with the pairs of conical disks. The European patent EP-PS 0 518 478 shows a variation of the same concept, where additional bolts are connected to the links for the transmission of a force or torque and the end surfaces of the bolts are in force-transmitting contact, specifically in frictional contact, with the pairs of conical disks.

In endless flexible torque-transmitting devices of this kind, at least a few of the force transfer elements or bolts are at any given time inside the space between the conical disks and enter into force-transmitting contact, specifically frictional contact, with the lateral surfaces of the pairs of conical disks, thereby transmitting a torque from one pair of conical disks through the endless flexible torque-transmitting device to another pair of conical disks. The transmission ratio can be varied by changing the radii of the path segments where the endless flexible torque-transmitting device is in contact with the pairs of conical disks. The torque is transmitted along the endless flexible torque-transmitting device through the force-transfer elements and the links.

As the endless flexible torque-transmitting device runs on its closed path around the conical-disk pairs of the transmission, the angle enclosed between the links of neighboring rows changes, so that the curvature radius of the endless flexible torque-transmitting device varies as the latter runs along its path through the transmission. Endless flexible torque-transmitting devices according to DE 43 30 696 have two force-transfer elements per articulated joint arranged in a pair where the two elements of each pair roll on each other. With this type of rolling connection, it is possible for the force-transfer elements to become jammed in the links, a condition that impedes the rolling motion of a force-transfer element on its counterpart.

OBJECT OF THE INVENTION

The object of the present invention is to provide an endless flexible torque-transmitting device of the kind described at the beginning or a transmission comprising said flexible torque-transmitting device that is functionally more reliable and of the simplest construction possible.

SUMMARY OF THE INVENTION

In an endless flexible torque-transmitting device, particularly of the kind that runs in an endless loop around a first and second pair of conical disks in the torque-flow path of a continuously variable transmission of a motor vehicle and has pairs of force-transfer elements that are perpendicular to the running direction and pass through openings of links that are parallel to the running direction, so that the force-transfer elements establish articulated joints between the links, the object of the invention is met by an arrangement where at least individual pairs of force transfer elements are coupled to each other by at least one holder element per pair of force transfer elements.

It is particularly suitable for the purpose if the holder element is a ring-like holder element. It is particularly practical if the thickness of the holder element does not exceed the thickness of the links, so that the holder elements can be placed at unoccupied positions or gaps in the link pattern of the endless flexible torque-transmitting device.

It is practical if the ring-like holder element is a closed ring. It can also be practical if the ring-like holder element is a ring that is open at one place. In another embodiment, it is practical for the holder element to be an essentially U-shaped holder element.

Endless flexible torque-transmitting devices are configured advantageously as periodic arrays that repeat themselves every two links or every three links and will herein be referred to as two-link arrays or three-link arrays, respectively.

It is also advantageous if the arrangement of links in relation to a longitudinal median axis of the endless flexible torque-transmitting device is symmetric or else neither symmetric nor diagonal.

It is further practical if the links are of at least two different lengths. Together with the different lengths, it is practical if at least individual links have at least one extension on at least one end portion in relation to the running direction.

It is further advantageous according to another concept of the present invention if the links of the endless flexible torque-transmitting device have openings to accommodate the force-transfer elements and if the radially inner and/or radially outer portion (in relation to the loop of the endless flexible torque-transmitting device) of each opening has an essentially smooth or straight contour.

It is further advantageous according to another concept of the present invention if the links of the endless flexible torque-transmitting device have openings to accommodate the force-transfer elements and if the radially inner and/or radially outer border portion of each opening has at least one or two noses that extend in the inward or outward radial direction of the loop of the endless flexible torque-transmitting device.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention is explained below with details referenced against the attached drawing, where.

DETAILED DESCRIPTION OF THE INVENTION

Figure 1:
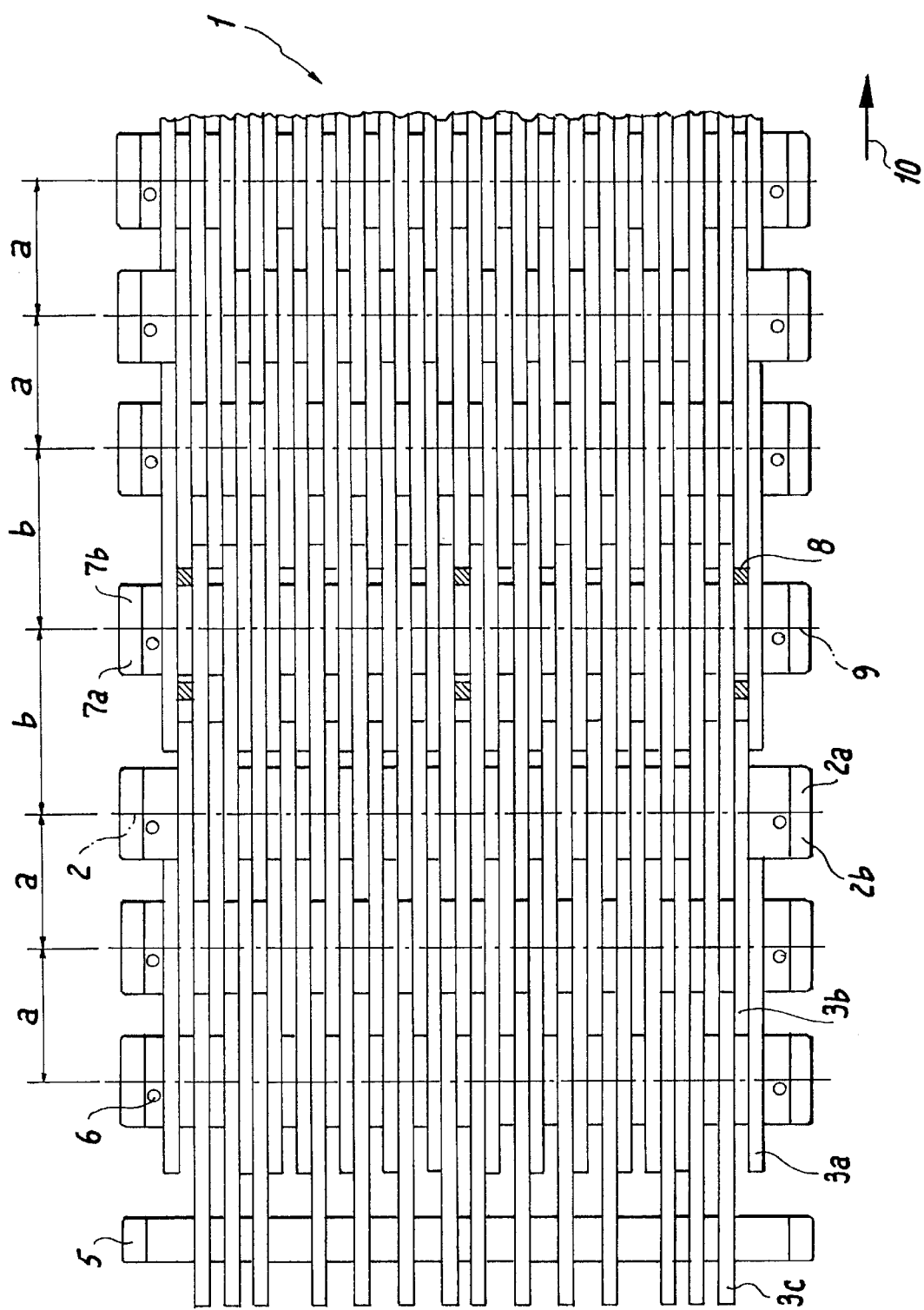
FIG. 1 represents a segment of an endless flexible torque-transmitting device.

FIG. 1 represents a segment of an endless flexible torque-transmitting device or chain belt 1 for a chain-belt transmission, particularly for the kind of continuously variable transmission that has conical disks and is used in a motor vehicle. Preferably, the transmission is arranged in the drive train of the motor vehicle between a prime mover unit (such as an engine) and the driven axles. The ratio of the transmission is adjustable to the working conditions of the engine and/or the commands of the driver.

The endless flexible torque-transmitting device 1 essentially connects two pairs or sets of conical disks in the torque-flow path in an arrangement where a transmission ratio change can be performed, i.e., controlled or regulated, by varying the radial position where the endless flexible torque-transmitting device engages the conical disks. One of the pairs of conical disks can be coupled at least to a transmission input shaft which, in turn, can be coupled to an output shaft of a prime mover unit such as an internal combustion engine. The other pair of conical disks can be coupled at least to a transmission output shaft.

The endless flexible torque-transmitting device consists essentially of force-transfer elements 2 that can advantageously be arranged in pairs 2a, 2b. The force-transfer elements 2 or 2a, 2b are arranged perpendicular (transverse) to the running direction of the endless flexible-torque transmitting device, the running direction being indicated by the arrow 10. The running direction of the endless flexible torque-transmitting device essentially corresponds to the direction of the connection between the pairs of conical disks and, as a rule, coincides with the lengthwise direction of the endless flexible torque-transmitting device.

The force-transfer elements 2 or 2a, 2b engage the openings 4 of the links 3a, 3b, 3c, where the arrangement and sequence of the links are selected in accordance with a two-link array or a three-link array. The respective embodiments of a two-link array and a three-link array are described in the German patents DE-PS 30 27 834, DE-PS 33 24 318, and DE-PS 38 26 809. In addition, the earlier applications DE-PS 30 27 834, DE-PS 33 24 318, and DE-PS 38 26 809 are referenced by the present invention, and their content is expressly included in the substance material disclosed in the present application.

It is advantageous if the openings 4 are designed for two force-transfer elements to pass through one opening, or the openings can be expanded to receive four force-transfer elements. In the design version where two force-transfer elements are engaged in one opening, the links have essentially two openings, so that a total of four force-transfer elements are engaged in the openings of one link. In a design version where four force-transfer elements are engaged in a larger opening of one link, there is essentially only one opening 4 per link. The larger opening can be formed by connecting two openings as one large combined opening, or it can also be formed by omitting a narrow portion of material that would otherwise separate two openings from each other.

To reduce weight or optimize strength, i.e., to optimize the stress distribution in the links of the chain belt, it is possible with both versions to provide additional openings in the links.

The end surfaces 5 of the force-transfer elements 2a, 2b are in force-transmitting, frictional contact with the working side surfaces of the pairs of conical disks of the transmission and transmit or impart a torque or a force from one pair of conical disks through the endless flexible torque-transmitting device to another pair of conical disks. The end surfaces 5 transmit friction forces between the lateral surfaces of the pairs of conical disks and the endless flexible torque-transmitting device or, more specifically, the chain belt. Furthermore, the force-transmitting elements 2a, 2b transmit or impart a tensile force to the links 3a, 3b, 3c. The force-transfer elements 2a, 2b are secured by means of a retainer element 6 at least at one end against falling out of the links 3a, 3b, 3c. The retainer elements 6 also serve to secure at least individual links preferably along the edge of the endless flexible torque-transmitting device from falling into a twisted position.

Furthermore, holder elements are provided for coupling each of the pairs of force-transfer elements 7a, 7b that form the articulated joints 9. The holder elements are configured preferably as ring-shaped or horseshoe-shaped elements. The ring-shaped elements can be open or closed. The inside contour of the holder elements is shaped so that the force-transfer elements remain joined and their mode of articulated motion is secured as they move in relation to each other. In this arrangement, it is practical if the force-transfer elements rest against the inside contour along at least two surface segments and if the surface segments are allowed to slide in relation to the holder element during the phases of articulated motion.

In one embodiment, the links 3a, 3b, 3c are of at least two different lengths. Together with the different lengths, it is practical if at least one of the individual links 3a, 3b, 3c have at least one extension on at least one end portion in relation to the running direction.

Figure 2:
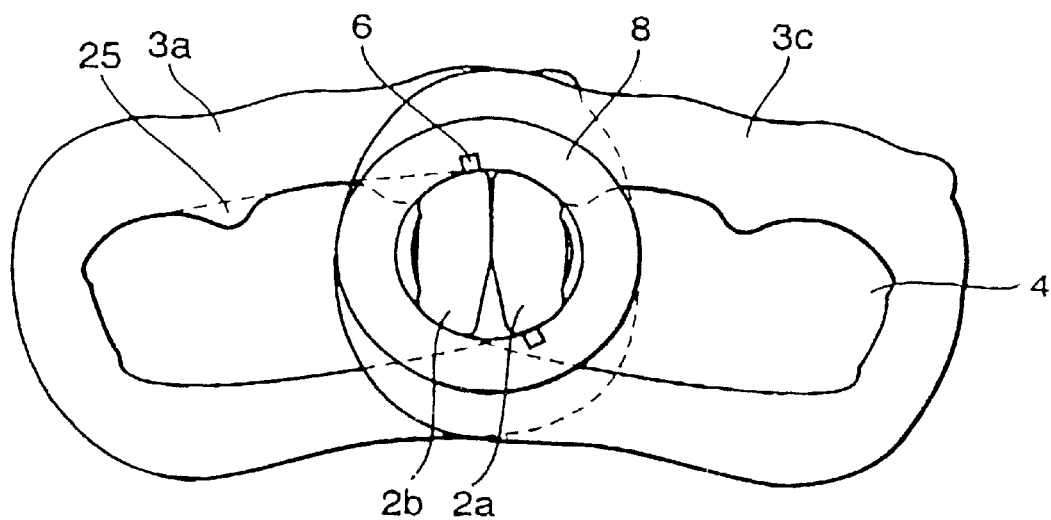
FIG. 2 represents an arrangement of links.

FIG. 2 represents a sectional view of an endless flexible torque-transmitting device 1 in which the force-transfer elements 2a, 2b (or also 7a, 7b of FIG. 1) and the links 3a and 3c are shown. The pair of force-transfer elements 2a, 2b is engaged in openings or cutouts 4 of the links 3a, 3c. The force-transfer elements are secured by retainer elements 6 against falling out of the openings 4. A retainer element can, e.g., be formed as a spot weld, as has been proposed in the German patents 44 15 838 and 35 26 062. In addition, the earlier applications DE-PS 44 15 838 and DE-PS 35 26 062 are referenced by the present invention, and their content is expressly included in the substance material disclosed in the present application.

The openings 4 of at least individual links are of a shape that does not provide a coupling connection for the force-transfer elements within their entire range of mobility. Therefore, ring-shaped holder elements 8 are provided for coupling the force-transfer elements of each articulated joint together. The holder element 8 embraces the force-transfer elements of an articulated joint and essentially restricts the force-transfer elements so that they remain in at least partial mutual contact while moving in relation to each other.

It is particularly advantageous if the holder element is a closed ring element. According to FIG. 3, it can also be practical if the holder element 20 is an open ring or a horseshoe-shaped, sickle-shaped, or U-shaped element.

It is further practical if at least individual links 3a, 3b, 3c of the endless flexible torque-transmitting device are configured such that the openings 4 have an inside contour or inside wall 21 with a smooth boundary at a radially inner and/or a radially outer location (where "radially inner" and "outer" refer to the inside and outside of the loop of the endless flexible torque-transmitting device). The link 3a of FIG. 2, for example, has a smooth boundary at the inside, while the outside boundary comprises the noses 25 and is therefore not smooth. In another embodiment, the noses 25 can also be arranged at the inside. They serve to guide the force-transfer elements within the openings of the links.

Figure 3:
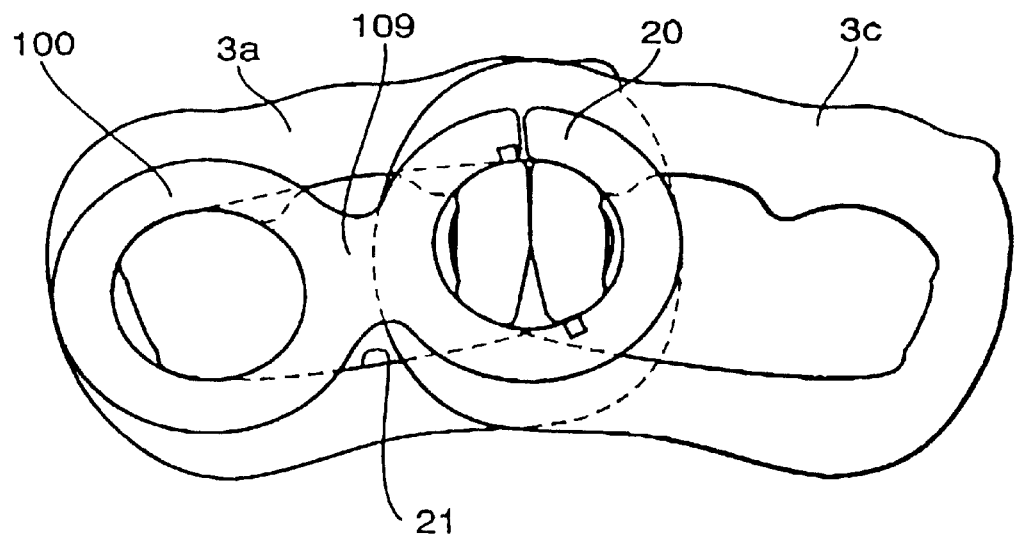
FIG. 3 represents an arrangement of links.

The link 3a of FIG. 3 has a smooth or continuous contour at the inside as well as at the outside. In this embodiment, the smooth contour is not interrupted by noses pointing inward or outward in the radial direction of the loop. Thus, the inside and outside segments of the contour 21 are either straight or only slightly curved The absence of noses for guiding the force-transfer elements is advantageous for the strength of an endless flexible torque-transmitting device such as a chain belt.

The holder element can be arranged at an essentially arbitrary position in relation to the transverse direction of the chain. In a chain with links of at least two different lengths, it can be advantageous if the holder elements are arranged only at places where there is an articulated joint between two rows of long links. In this case, it is practical if not every articulated joint has a holder element. In another embodiment, there can be at least one holder element for each articulated joint.

In another embodiment, the holder element ensures that the rocker surfaces of the force-transfer elements of an articulated joint stay together even if the inside contour of the opening no longer provides a sufficient hold, e.g., for reasons of material strength.

Another embodiment contains a combined holder element made up of two holder elements that are connected to each other to ensure that the force-transfer elements of two articulated joints of the same link will stay in their places and not be dislodged, e.g., by sliding away from the border of the opening to the interior if the contour of the opening is not designed for a guiding function. A combined holder element 100 of this type, with two holder element parts joined by a connector bridge 101, is indicated in FIG. 3.

Figure 4:
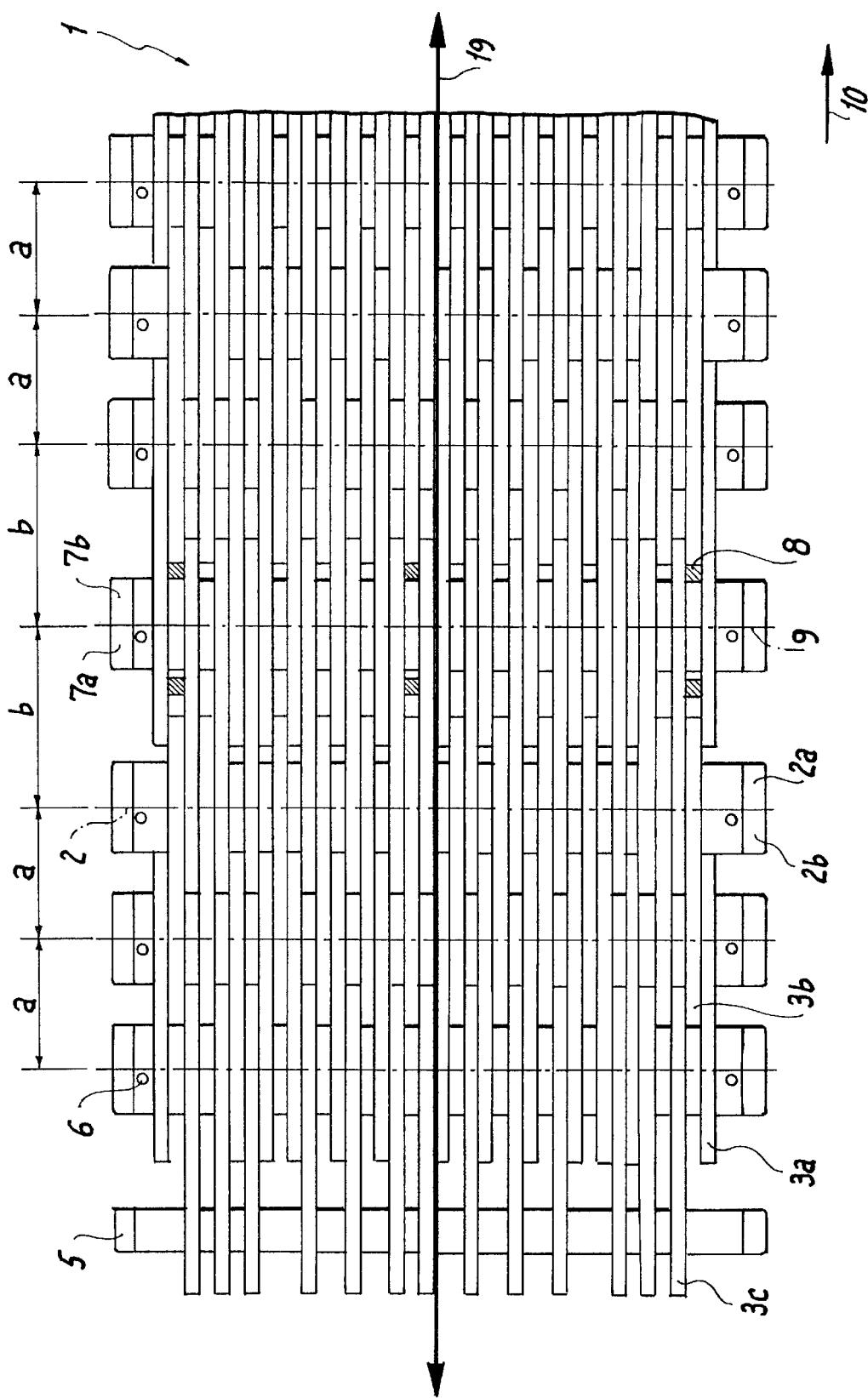
FIG. 4 represents a segment of an endless flexible torque-transmitting device according to another embodiment.
Figure 5:
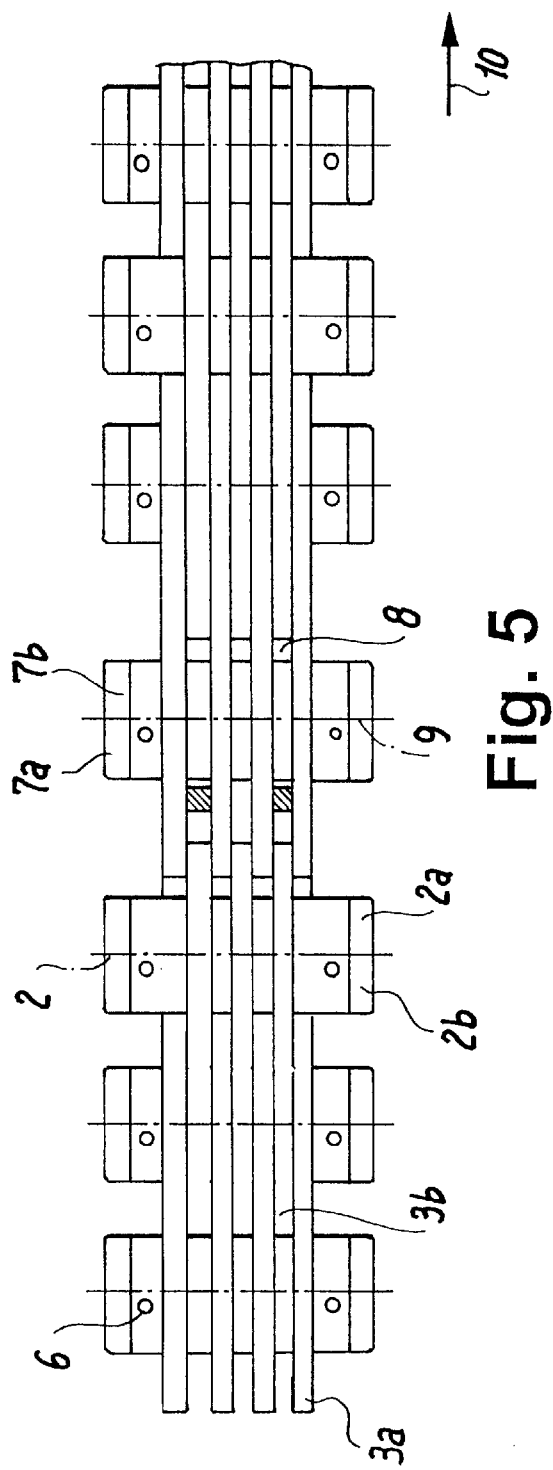
FIG. 5 represents a partial segment of an endless flexible torque-transmitting device according to another embodiment.
Figure 6:
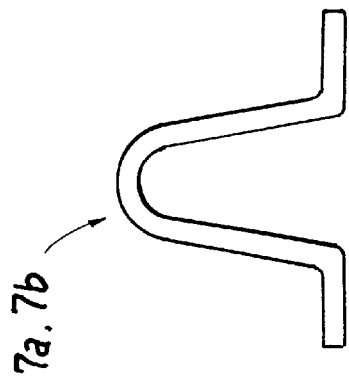
FIG. 6 represents an exemplary holder for use in the device of FIGS. 1 and 5.

FIG. 4 illustrates another embodiment in which the links 3a, 3b, 3c are arranged relative to a longitudinal median axis 19 of the endless flexible torque-transmitting device 1 in neither a symmetric nor diagonal orientation. FIG. 5 is a partial view of another embodiment of the endless flexible torque-transmitting device employing a two-link array design. FIG. 6 illustrates an exemplary holder element 7a, 7b which is U-shaped.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An endless flexible torque-transmitting device that runs in an endless loop around a first pair of conical disks and a second pair of conical disks in a torque-flow path of a continuously variable transmission of a motor vehicle, with pairs of force-transfer elements that are oriented transverse to a running direction of the endless flexible torque-transmitting device and pass through openings of links that are parallel to the running direction of the endless flexible torque-transmitting device, so that the force-transfer-elements form articulated joints between the links, comprising the improvement that each link has only one opening, and four force-transfer elements are passing through the opening of each link, so that the force-transfer elements are not coupled to each other within the entire range of movement that the force-transfer elements perform in relation to each other, and at least individual pairs of force-transfer elements are coupled to each other by means of at least one holder element, so that the force-transfer elements of each individual pair are in mutual contact with each other at least over a partial range of their movement in relation to each other.

2. The endless flexible torque-transmitting device of claim 1, wherein the holder element is a ring-like holder element.

3. The endless flexible torque-transmitting device of claim 1, wherein the holder element is a U-shaped holder element.

4. The endless flexible torque-transmitting device of claim 1, wherein the links are arranged in a two-link array.

5. The endless flexible torque-transmitting device of claim 1, wherein the links are arranged in a three-link array.

6. The endless flexible torque-transmitting device of claim 1, wherein the links are arranged symmetrically in relation to a longitudinal median axis of the endless flexible torque-transmitting device.

7. The endless flexible torque-transmitting device of claim 1, wherein the links are arranged neither symmetrically nor diagonally in relation to a longitudinal median axis of the endless flexible torque-transmitting device.

8. The endless flexible torque-transmitting device of claim 1, wherein the links are of at least two different lengths.

9. The endless flexible torque-transmitting device of claim 1, wherein at least individual links have at least one extension on at least one end portion of the link in relation to the running direction.

10. The endless flexible torque-transmitting device of claim 1, wherein the openings have an inward side and an outward side in relation to the endless loop, with at least one of the sides having a smooth border contour and no projections pointing toward the inside of the opening.

11. The endless flexible torque-transmitting device of claim 1, wherein the openings have an inward side and an outward side in relation to the endless loop, with at least one of the sides having at least one nose-like projection pointing toward the inside of the opening.

12. The endless flexible torque-transmitting device of claim 2, wherein the ring-like holder element is a closed ring.

13. The endless flexible torque-transmitting device of claim 2, wherein the ring-like holder element is an open ring.

* * * * *